Sept. 15, 1959
A. SORG
2,904,448
METHOD OF MAKING FILTER PAPER HEAT SEALABLE
Filed Aug. 9, 1956
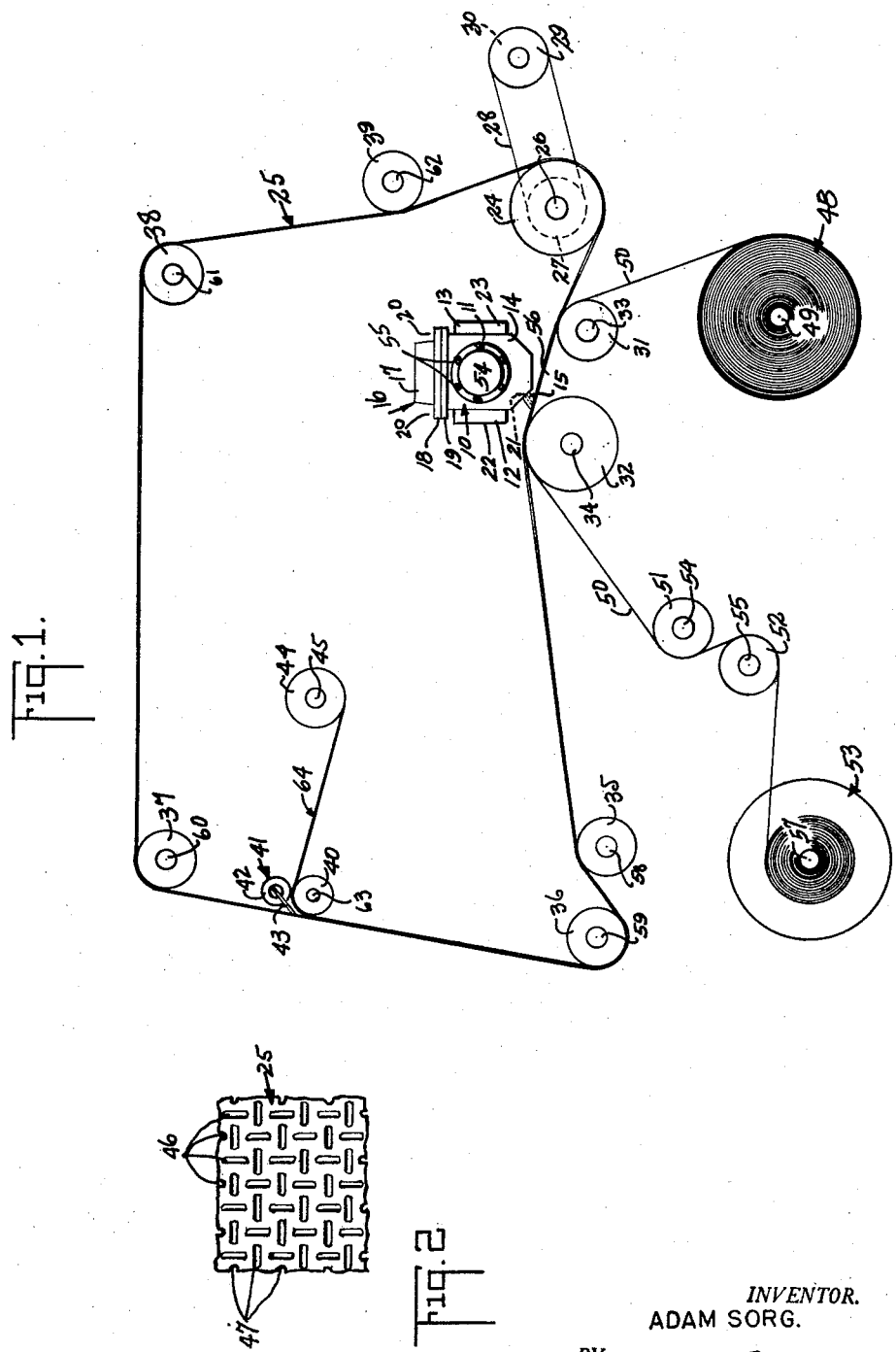
INVENTOR.
ADAM SORG.
BY J. C. Grier
ATTORNEY.

2,904,448
METHOD OF MAKING FILTER PAPER HEAT SEALABLE

Adam Sorg, Glendale, N.Y., assignor, by mesne assignments, to Adam Sorg and Edwin V. Hadley, New York, N.Y.

Application August 9, 1956, Serial No. 603,151

4 Claims. (Cl. 117—38)

This invention relates to a method of applying a thermoplastic material to the surface of a paper web in such a manner that areas of said materials are applied to the paper, with infusion areas dispersed thereabout over the surface of said paper in a predetermined array, and the areas of said material form heat sealing means for forming infusion packages.

Heretofore in the art relating to heat sealed infusion packages, it was customary to apply a vinyl plastic compound in a predetermined all-over pattern, the vinyl compound having previously been thinned with a solvent, such as acetone, for example, and this solution is applied to the surface of a printing roll, a printing drum or a rotogravure and thence to the surface of a web of filter paper. Following this step, the print or the like is put through drying operations, but it is next to impossible to drive out all of the solvent, even though the paper is discolored from the heat, a "tea taster" can still taste traces of the acetone or other solvent, and the following disadvantages obtain.

Extra handling increases the cost of the product. The extra handling and extra heat lowers the quality of the paper and consequently its wet strength.

It is among the objects of the present invention to provide a method of treating filter paper to make it heat sealable but leaving it permeable to liquids, such as for use in making tea bags.

It is also among the objects of the invention to provide a simple and efficient method whereby a thermoplastic material may be deposited on filter paper in a pattern of disconnected areas.

It is further among the objects of the invention to provide a continuous operation wherein said paper is moved in contact with a stencil through which said thermoplastic material is extruded.

Referring to the drawings:

Figure 1 is a diagrammatic representation of apparatus suitable for practicing the invention; and Figure 2 is a greatly enlarged fragmentary view of one form of perforated belt, whether it be formed of metal or any other similar material.

Referring to said drawings, particularly Figure 1, I employ an extruding head 10, which is a pressure vessel, comprises a body 11 having double wall sides 12 and 13, a front end wall 14, and a similar rear end wall (not seen in Figure 1). The extrusion head has an extrusion nozzle 15.

The extruding head has a removable top 16 with a dome portion 17 and a flange 18 formed integral with the dome 17. The upper end of the body 11 has a flange 19 matching the flange 18 and having threaded holes therein aligned with clearance holes in the flange 18 to accommodate a series of cap screws 20, which secure the flanges together in a fluid tight manner with suitable gasket means therebetween.

The extrusion nozzle 15 has an elongated slot 21 therein which is in communication with the interior of the extruder. The extruder has electrical heating elements (not shown) inside the body 11 and also in the dome portion 17. One or more auxiliary heating elements 22 and 23 may be mounted on the exterior walls of the extruder. These electrical heating elements are preferably provided with thermostatic means for controlling the heat generated therein. The extruder head may also contain spiral conveyor or screw means (not shown) adjacent to the inner passage 21 for impressing suitable pressures moving the thermoplastic material within the lower portion of the extruder body and forcing the thermoplastic sheet and deposit in a manner to be presently described.

An endless belt 25 has a portion partially embracing a roller 24 which is fixedly carried on a shaft 26.

The endless belt 25 is preferably made of metal, although many other different materials may be employed. The material of which the endless belt is formed is perforated or otherwise configured according to a predetermined pattern, and the perforations act as masks through which the thermoplastic, deposited upon the paper, passes. Also fixed on the shaft 26 is a pulley 27 driven by means of a belt or chain spanning the pulleys 27 and 29. The pulley 29 is fixed on the shaft of a motor or prime mover 30.

The endless belt 25 contacts spaced apart rolls 31 and 32 which have shafts 33 and 34, respectively. Then the belt 25 passes over a roller 35 and under and around a roller 36, and thence upwardly and around a roller 37. From the roller 37 it extends across to a roller 38 and then down to the roller 24, and between the rollers 38 and 24, it is contacted by a roller 39.

The belt 25, between rollers 36 and 37, is contacted by a roller 40. Adjacent to the roller 40 is device 41 for stripping the remaining thermoplastic material from the belt. This device includes a support 42 which may be angularly adjusted about its axis and then secured in an adjusted position. The device carries a blade or the like 43 which peels the residual thermoplastic web from the endless belt 25 and is rolled up on a reel 44 carried on an axis 45. A driving means, such as a small motor (not shown) acting through a slipping clutch forms a practical take-up for said residual web. The nature of the residual web is that it is a web of thermoplastic material which has openings therein in a pattern like the pattern formed in the endless belt.

In Figure 2, I show a fragment, greatly enlarged, of one pattern of many suitable for use as the endless belt 25.

The web 25 has a series of rows of substantially parallel elongated perforations 46 extending in one direction and a second series of rows of substantially parallel elongated perforations 47 extending in a direction 90° with respect to said first direction and interspersed between said first perforations.

The residual web referred to above has a similar appearance to the endless belt because where the thermoplastic material is delivered to the filter paper is through the perforations.

The rolls 39 and 35, as well as the rolls 31 and 32 all tend to tighten the endless belt 25. The rolls 31 and 32 have additional functions, which will now be described in detail.

The roll 31 is normally in contact with the belt 25, and a roll 48 of filter paper 50 is supported for rotation on a shaft 49 and this filter paper passes between the roll 31 and the belt 25 and extends forwardly (to the left as viewed in Fig. 1) around the roller 32 and thence it passes about rolls 51 and 52, and then onto a take-up reel 53. The roll 31 may be utilized as a plain roll, or it may be utilized as a heat roll, depending on the paper and its moisture content. If the moisture content is below a certain minimum, heating the roll 31 is unnecessary, while a higher moisture content might make it necessary to heat the roll 31 to dry out the paper web.

The rolls 35, 36, 37, 38 and 39 are supported for rotation on shafts 58, 59, 60, 61 and 62, respectively, while the shaft 63 supports a roll 40, over which the residual web 64 passes to the take-up system 44, 45.

The roll 32 is a chill roll. It is hollow, and it is supplied with a cold brine or other suitable fluid medium through a suitable stuffing box (not shown).

The extruder head may have hand holes on one or both ends, and these are covered with sealing plates, one of which is shown at 54 and secured in fluid tight relation to the body 14. These hand holes and also the top 16 may be removed for cleaning, adjustment of the elements inside and for loading the extruder head with thermoplastic material.

Example: The thermoplastic compound in powder, pellet or other convenient form is placed in the extruder head, and the material is reduced by heat and pressure to a fluid state so that it may be extruded on to the belt 25 and the temperatures run between 300 and 375° F. the thermoplastic material falls into the worm and is forced out via the slot 15 therein and onto the moving belt 25. The pressures exerted by said worm are of the order of between 25 and 80 p.s.i.

Since the web of filter paper 50 and the web of the endless belt 25 move in unison within a space 56 between the rolls 31 and 32, and since the extruder head deposits the thermoplastic material upon the upper (endless belt) in a zone within the said space, the hot material, where it encounters perforations, passes through the perforations and lands on the paper, while the portions on the solid parts of the belt 25 remain thereon. When the chill roll 32 is encountered, the hot material on the endless belt forms a perforate thermoplastic web, while that material on the filter paper 50 sets as a series of thermoplastic spots which increase the wet strength of the filter paper and some of them are utilized for heat sealing when making infusion packages with said filter paper.

The perforate plastic web above referred to is removed from the surface of the endless belt by means of the device 41, in which the blade 43 is set to peel the thermoplastic web off from the belt 25 so that it may be rolled upon the take-up device 44, after which it is re-melted and used again in the extruder head 10.

The paper web 50, after having been chilled by the chill roll 32, leaves the path of the endless belt 25, passes over chill rolls 51 and 52, and on to a take-up reel system 53 which is carried on a shaft 57 and includes frictional slipping clutch means which is usual in most take-up reel systems.

In forming such filter paper web-thermoplastic spot combinations I have made experimental tests with the web 50 moving at rates of about 175 feet per minute at extrusion temperatures of 430° F., and higher even up to 500° F.

Among the thermoplastic compounds available, my first choice is polyethylene, followed by the following in the order named: polystyrene, vinyl compounds, and saran.

To those skilled in the art, it is obvious that many changes may be made in the arrangements shown and described without departing from the spirit of the invention, and therefore the invention is only limited by the scope of the following claims.

I claim:

1. A method of processing filter paper to make it heat sealable for use in infusion bags which consists in providing a molten synthetic plastic material free from volatile solvents, providing a thin, liquid-permeable sheet of filter tissue paper, passing said paper continuously in contact with a continuously moving stencil having perforations therein which provide discontinuous areas in a uniform pattern the elements of which intersect transverse and longitudinal lines drawn on said stencil, causing said plastic material to flow through said stencil and onto said paper to form said pattern on the contacting face of said paper, while maintaining the opposite face of said paper substantially free from plastic material so that the areas between the adhering plastic material on the paper remain permeable and said areas constitute a large proportion of the total area, immediately thereafter chilling both stencil and paper, then separating said paper from said stencil and removing the residual plastic material from said stencil.

2. A method according to claim 1 in which said plastic material is polyethylene.

3. A method according to claim 1 in which said plastic material is extruded onto said stencil under pressure.

4. A method according to claim 1 in which said residual material is scraped from said stencil in the form of a film which is wound into a roll.

References Cited in the file of this patent

UNITED STATES PATENTS

| | | |
|---|---|---|
| 1,495,146 | Ariente | May 27, 1924 |
| 1,999,903 | Harshberger | Apr. 30, 1935 |
| 2,056,273 | Holdsworth | Oct. 6, 1936 |
| 2,313,696 | Yates | Mar. 9, 1943 |
| 2,407,549 | Gurwick | Sept. 10, 1946 |
| 2,498,197 | Baxter | Feb. 21, 1950 |
| 2,698,574 | Dougherty | Jan. 4, 1955 |
| 2,782,130 | Ness | Feb. 19, 1957 |